Feb. 4, 1958 F. J. SCHENKELBERGER 2,822,101
INDUSTRIAL TRUCK WITH LATERALLY
ADJUSTABLE FORK MEMBER
Filed April 21, 1955 2 Sheets-Sheet 1

INVENTOR.
FRANK J. SCHENKELBERGER

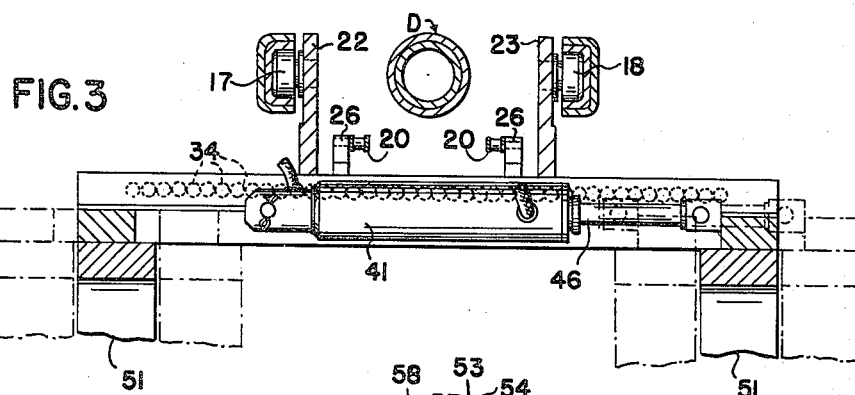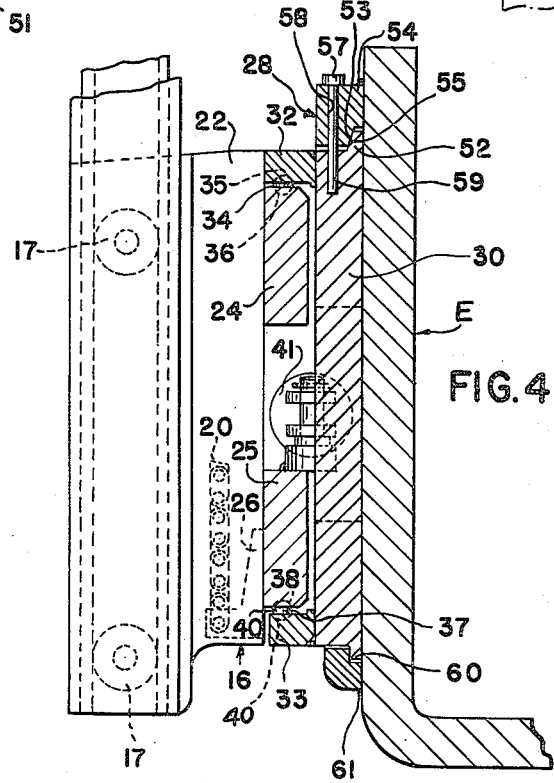

United States Patent Office 2,822,101
Patented Feb. 4, 1958

2,822,101

INDUSTRIAL TRUCK WITH LATERALLY ADJUSTABLE FORK MEMBER

Frank J. Schenkelberger, North Olmsted, Ohio, assignor to The Baker-Raulang Company, Cleveland, Ohio, a corporation of Delaware Application April 21, 1955, Serial No. 502,772

6 Claims. (Cl. 214—730)

The present invention relates to a material handling apparatus and, more particularly, to an industrial lift truck having an elevatable load carrier mounted on the front end or side of the chassis thereof.

The principal object of the present invention is the provision of a new and improved material handling apparatus having a load carrier frame adapted to mount a load engaging member and an elevatable carriage supporting the load carrier frame for elevational movement with the carriage, the load carrier frame being connected to the carriage by simple, durable antifriction means permitting the load carrier frame to be easily moved in a transverse direction with respect to the line of elevational movement of the load carriage even though the load carrier frame is under a heavy load.

Another object of the present invention is the provision of a new and improved industrial lift truck having an elevatable carriage, a load carrier frame supported by the elevatable carriage for elevational movement with the carriage, power means for shifting the load carrier frame with respect to the carriage transversely of the line of elevational movement, and antifriction means, such as ball bearing means, intermediate the elevatable carriage and the load carrier frame connecting the latter to the carriage and minimizing frictional forces opposing the transverse movement of the load carrier, thereby permitting the load carrier to be readily shifted in a transverse direction even though under heavy load.

Another object of the present invention is the provision of a new and improved industrial lift truck having a chassis, an elevatable load carriage on the chassis, a load carrier frame, and means connecting the load carrier frame to the carriage for generally horizontal movement with respect to the carriage, the load carrier frame being so constructed and arranged that fork members of a conventional construction may be readily and adjustably connected thereto.

The invention resides in certain constructions and combinations and arrangements of parts, and further objects and advantages thereof will be apparent to those skilled in the art to which it relates from the following description of the preferred embodiment described with reference to the accompanying drawings forming a part of this specification, in which:

Fig. 3 is a sectional view taken approximately along line 3—3 of Fig. 2 with certain parts omitted; and Fig. 4 is a sectional view taken approximately along line 4—4 of Fig. 2.

Figures 1, 2:
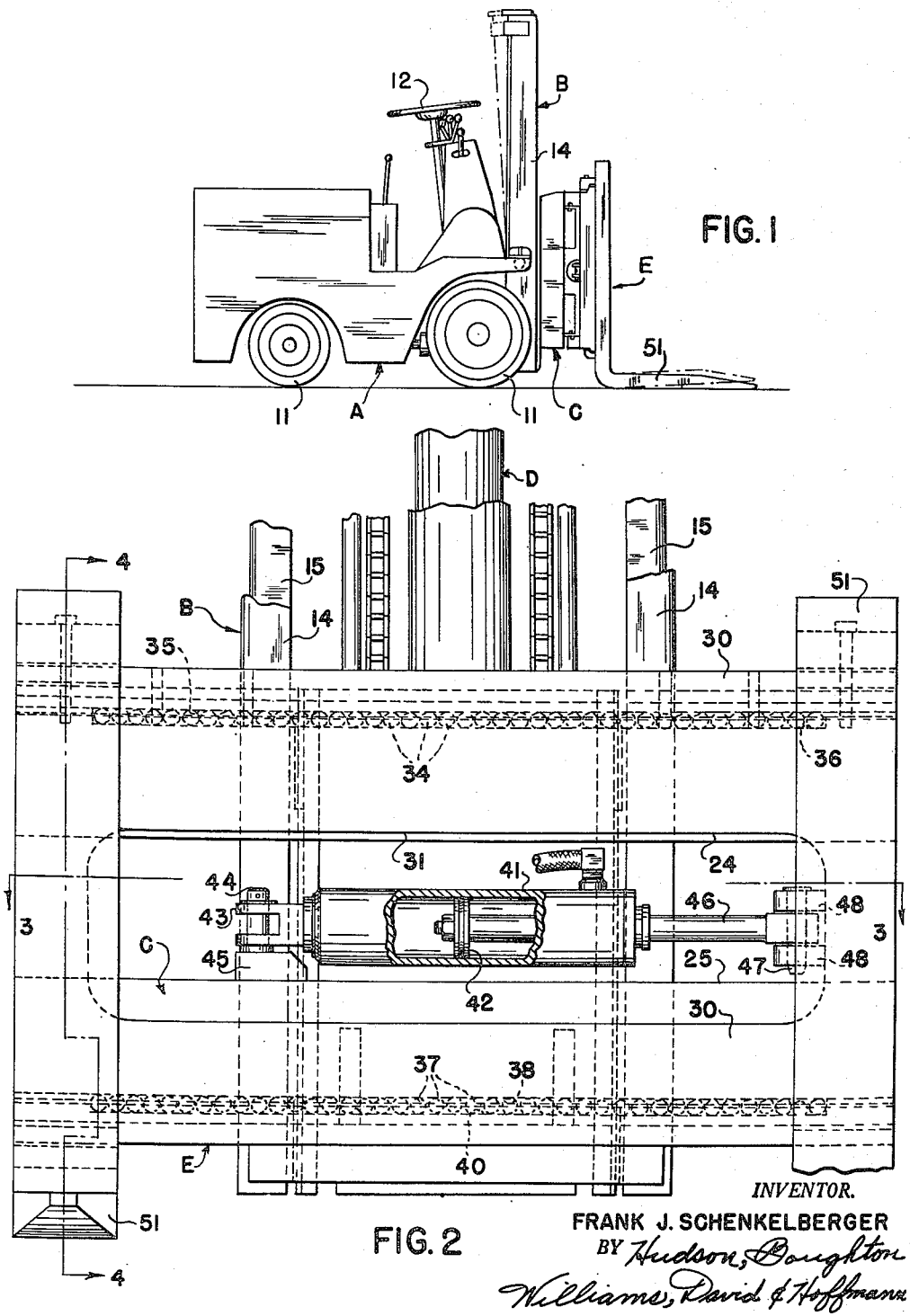
Fig. 1 is a side elevational view of an industrial lift truck embodying the present invention.
Fig. 2 is an enlarged fragmentary, front elevational view of the lift truck of Fig. 1 showing the elevatable carriage and load carrier frame.

Although the present invention is susceptible of various modifications and of use with various types of material handling apparatus, it is herein shown and described as embodied in an industrial lift truck having an elevatable load carriage supported on the front end thereof.

Referring to the drawings, the industrial lift truck shown comprises a chassis A supported on front and rear wheels 11. The front wheels are preferably driven by suitable means, such as an electric motor, and the rear wheels are preferably dirigibly connected to the chassis so as to be directable by a steering wheel 12 supported on the chassis adjacent to the operator's position.

The chassis A has a vertically extending mast assembly B mounted on the front end thereof for limited tilting movement about a horizontal axis upon the operation of a hydraulic cylinder 13. The mast assembly B is of conventional construction and will not, therefore, be described in detail. Suffice it to say that the assembly comprises, in the illustrated embodiment, upright, laterally spaced primary guides 14 of channel shape, secondary guides 15, also channel shaped and adapted to telescope, respectively, into the primary guides 14, an elevatable carriage C movable vertically with respect to the guides and having pairs of rollers 17, 18 adapted to operate in the channels of the secondary guides, and a vertical hydraulic cylinder assembly D operable to raise and lower the elevatable carriage C relative to the secondary guides 15 through chains 20 connected to a movable member of the cylinder assembly. After a predetermined elevational movement of the carriage C relative to the secondary guides, the cylinder assembly also operates to raise both the secondary guides and the carriage relative to the primary guides 14. Since the mast assembly, per se, for supporting and elevating the load carriage C forms no part of the present invention, it may be of any conventional construction and it is to be understood that other elevating means may be substituted for that shown.

The pairs of rollers 17, 18 for guiding the vertical movement of the load carriage C are mounted respectively on generally parallel, spaced vertical plates 22, 23. The plates 22, 23, extend forwardly of the spaced guides of the mast assembly and are connected together at their forward edge by upper and lower horizontal frame members 24, 25. The frame members 24, 25 extend horizontally beyond the vertical plates 22, 23 for reasons which will appear hereinafter. The chains 20 for raising and lowering the load carriage 16 are each connected to blocks 26 fastened to the inner face of the frame member 25 in any suitable manner, such as by welding.

A load carrier frame E is supported by the horizontal frame members 24, 25 of the carriage C for side shifting movement along a line generally transverse to the line of elevational movement of the load carriage 16. The load carrier frame E comprises a plate-like member 30 having an elongated central opening 31 therein. The member 30 has, on its back side adjacent to its upper and lower edges respectively, upper and lower horizontally extending support members 32, 33. The support members 32, 33 are adapted to be positioned immediately above and below the frame members 24, 25 respectively of the carriage when the load carrier frame E is properly positioned on the carriage. The upper support member 32 is connected to the upper frame members of the carriage C by antifriction means or ball bearings 34 which operate in opposed, horizontally extending races 35, 36 in the adjacent edges of the support member 32 and frame respectively. The race 35 is in the lower edge of support member 32 and the race 36 is in the upper edge of the frame member 24. The lower support member 33 is mounted on the plate-like member 30 adjacent to the lower edge or side of the lower frame member 25 of the carriage and antifriction means or ball bearings 37 operating in races 38, 40 in the adjacent edges or sides of the members 25, 33, respectively, connect the support member to the lower frame member 25 of the carriage C for movement along the lower frame member. The top races 35 and 38 for the ball bearings 34, 37 extend respectively the length of the upper support member 32 of the load carrier frame and the lower horizontal frame member 25 of the carriage C. The lower races 36, 40 terminate short of the ends of the members 24, 33, respectively, and hold the ball bearings in place as the load carrier frame is shifted sideways with respect to the carriage C and the chassis A of the truck.

The load carrier frame E, in the illustrated embodiment, may be shifted sideways with respect to the carriage by actuation of fluid pressure means comprising a cylinder 41 and cooperating piston 42. The cylinder 41 is connected to the carriage 16 by a bracket 43 fixed to one end thereof and adapted to receive a stud 44 mounted on a block 45 welded to the upper edge of the lower horizontal frame member 25 of the carriage. The piston 42 which operates in the cylinder 41 is connected to the plate-like member 30 by a piston rod 46 and a pin 47 passing through the outer end of the piston rod, the pin 47 being supported between spaced lugs 48 mounted on the plate-like member 30 at the right-hand end of the opening 31, as viewed in Fig. 2.

The cylinder 41 is preferably a double-acting type cylinder and the load carrier frame E may be shifted either to the right or to the left with respect to the carriage C, depending upon which side of the piston 42 is subjected to fluid pressure. The piston 42 is preferably positioned at approximately the mid-point of the length of the cylinder 41 when the load carrier frame is centrally positioned on the carriage. The pin 47 connecting the piston rod to the plate-like member 30 is readily removable to permit the load carrier frame E to be disconnected from the carriage 16 and the bracket 43 is preferably secured to the stud 44 by means of a removable pin member 50 or other suitable means permitting the cylinder 41 to be removed from the carriage 16 in the event that the latter is to be used with an apparatus which does not require a power operated hydraulic cylinder.

The load carrier frame 28 is preferably so constructed and arranged that it may be used with a removable load engaging attachment such as a fork member and in the illustrated embodiment is constructed so as to support wedge type fork members 51; it being understood that the load carrier frame may be otherwise constructed to removably support attachments or for fixedly mounting a non-removable load engaging member if so desired. To support the fork members 51 the upper edge of the plate-like member 30 has a vertically extending flange portion 52 substantially coextensive with the length thereof. The flange portion 52 has a rear face 53 inclined from the top thereof toward the back side of the plate-like member 30. The fork members 51 each have on the back side of their upper portions a block 54 which is cut out along the lower edge of the block adjacent to the fork member, as indicated at 55, so as to fit over the flange 52 and to provide an inclined surface 56 adapted to mate with the rear face 53 of the flange 52. The inclination of the surface 56 is such that it cooperates with the face 53 of the plate-like member 30 to support the fork members with clearance between the block 54 and the horizontal or non-inclined portions of the upper edge of the member 30. The fork member 51 is held in its proper position on the plate 30 by a pin 57 which is dropped through a vertically extending opening 58 in the block 54. The lower end of the pin 57 is adapted to be received in any one of a plurality of openings 59 in the upper edge of the plate-like member 30.

The lower edge of the plate-like member 30 is provided with a depending flange which cooperates with an L-shaped member 61 fastened to the backside of the fork member 51 adjacent to the lower end thereof to limit the movement of the bottom of the fork member away from the load carrier frame. The L-shaped member 61 hooks over the flange 60 and together with the block 54 at the upper end of the fork members securely fastens the fork members to the plate-like member 30. In the illustrated construction, the fork members 51 are positioned on the plate-like member 30 by lining up the flanges 52, 60 with the spaces provided by the members 54, 61, respectively, and the plate-like member 30 and sliding the fork members onto the plate-like member from one end thereof.

From the foregoing, it will be apparent that the enumerated objects of the present invention and others have been accomplished and that a new and improved material handling apparatus has been provided which comprises an elevatable carriage and a load carrier supported by the carriage for sideways movement transversely of its line of elevation, the load carrier being connected to the carriage by simple, durable antifriction means, which permits the load carrier to be shifted with respect to the carriage even though under heavy load and which is preferably so constructed and so arranged that load engaging attachments or members of a conventional or other construction may be removably supported thereon.

While a preferred form of the invention has been described in considerable detail, it will be apparent that the invention is not limited to the particular constructions shown or the uses referred to, and it is my intention to cover all adaptations, modifications and changes which come within the practice of those skilled in the art to which the invention relates and the scope of the appended claims.

Having thus described my invention, I claim:

1. In a material handling apparatus, a frame, a load carrier frame, a carriage supported for elevational movement on the first-said frame and including a member having a surface extending generally transversely of its line of elevational movement for supporting said load carrier frame, said load carrier frame including a portion having a surface opposed and parallel to the first said surface, antifriction means intermediate said surfaces connecting said load carrier frame to said member for movement therealong, and double acting power actuated means operatively connected to said carriage and to said load carrier frame for moving the load carrier frame with respect to the carriage.

2. In a material handling apparatus, a frame, a load carrier frame, a load carriage supported for elevational movement on the first-said frame and including a member having a surface extending generally transversely of its line of elevational movement for supporting said load carrier frame, said load carrier frame including means for detachably connecting a pair of fork members thereto and a portion having a surface opposed and parallel to the first said surface, antifriction means intermediate said surfaces connecting said load carrier frame to said member for movement therealong, and double acting power actuated means connected between said carriage and said load carrier frame for moving said load carrier frame along said member.

3. In a material handling apparatus, a frame, a carriage supported by said frame for elevational movement with respect thereto, a load carrier frame, said carriage including a load carrier frame supporting portion having first and second vertically spaced generally horizontal surfaces for supporting said load carrier frame for sideways movement transversely of the line of elevational movement of the carriage, said load carrier frame including a portion having first and second surfaces opposed respectively to the first and second surfaces of said carriage, said opposed surfaces extending along the line of movement of said load carrier frame with respect to said carriage, antifriction means positioned intermediate the said opposed surfaces for connecting said load carrier frame to the carriage and permitting said transverse movement of the load carrier frame and double acting power actuated means operatively connected to said carriage and to said load carrier frame for moving the load carrier frame with respect to the carriage.

4. In a material handling apparatus, a frame, a carriage supported by said frame for elevational movement with respect thereto, a load carrier frame, said carriage including a load carrier frame supporting portion having first and second vertically spaced generally horizontal surfaces for supporting said load carrier frame for sideways movement transversely of the line of elevational movement of the carriage, said load carrier frame including a portion having first and second surfaces opposed respectively to the first and second surfaces of said carriage, said opposed surfaces having ball bearing races therein extending along the line of movement of said load carrier frame with respect to said carriage, ball bearings positioned in said races for connecting said load carrier frame to the carriage and permitting said transverse movement of the load carrier frame, and double-acting power actuated means connected between said carriage and said load carrier frame for moving said load carrier frame with respect to said carriage.

5. In an industrial lift truck, a chassis, a load carrier frame, a fork member for engaging a load to be handled, means for adjustably connecting said fork member to said frame and for securing said fork member in one of a plurality of positions on said load carrier frame, a load carriage supported for elevational movement by said chassis and including a frame member having first and second vertically spaced surfaces extending generally transversely of its line of elevational movement for supporting said load carrier frame, said load carrier frame including a portion having first and second surfaces opposed and parallel respectively to the said first and second surfaces of said carriage, antifriction means intermediate the said opposed surfaces for connecting said load carrier frame to said member for movement therealong, and double acting power actuated means connected between said carriage and said load carrier frame for moving said load carrier frame along said frame member.

6. In a material handling apparatus, a frame, a load carrier frame having a vertical flange along its upper horizontal edge, said flange having rear face inclined with respect to the vertical, a fork member including a portion adapted to receive said flange, said portion having an inclined surface adapted to cooperate with said face to support the fork member, means for adjustably securing said fork member in one of a plurality of positions along said edge, a carriage supported for elevational movement on said frame and including a frame member having a surface extending generally transversely of its line of elevational movement for supporting said load carrier frame, said load carrier frame including a portion having a surface opposed and parallel to the first said surface, ball bearing means intermediate said surfaces connecting said load carrier frame to said frame member for movement therealong, and power actuated means connected between said carriage and said load carrier frame for moving said load carrier frame along said frame member.

References Cited in the file of this patent

UNITED STATES PATENTS

| | | |
|---|---|---|
| 2,650,733 | Blatz | Sept. 1, 1953 |
| 2,663,443 | Schenkelberger | Dec. 22, 1953 |
| 2,672,378 | McVey | Mar. 16, 1954 |
| 2,675,139 | Mercier et al. | Apr. 13, 1954 |
| 2,692,170 | Penkala | Oct. 19, 1954 |
| 2,699,878 | Avery | Jan. 18, 1955 |